(12) United States Patent
Kitagawa

(10) Patent No.: US 7,926,855 B2
(45) Date of Patent: Apr. 19, 2011

(54) COUPLING, AND SOCKET AND PLUG FOR USE IN THE COUPLING

(75) Inventor: Hiroyuki Kitagawa, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 190 days.

(21) Appl. No.: 12/516,089

(22) PCT Filed: Nov. 22, 2007

(86) PCT No.: PCT/JP2007/072613
§ 371 (c)(1),
(2), (4) Date: May 22, 2009

(87) PCT Pub. No.: WO2008/062857
PCT Pub. Date: May 29, 2008

(65) Prior Publication Data
US 2010/0019493 A1   Jan. 28, 2010

(30) Foreign Application Priority Data
Nov. 24, 2006   (JP) ................. 2006-316567

(51) Int. Cl.
*F16L 37/18*   (2006.01)
(52) U.S. Cl. ........................ 285/316; 285/277
(58) Field of Classification Search .............. 285/277, 285/276, 316
See application file for complete search history.

(56) References Cited

U.S. PATENT DOCUMENTS

| | | | | |
|---|---|---|---|---|
| 2,255,333 A * | 9/1941 | Scheiwer | ............... | 285/277 |
| 2,461,699 A * | 2/1949 | Scheiwer | ............... | 403/316 |
| 2,473,973 A * | 6/1949 | Scheiwer | ............... | 285/277 |
| 3,420,497 A * | 1/1969 | Wilcox | ............... | 285/277 |
| 5,116,086 A * | 5/1992 | Psajd | ............... | 285/277 |
| 6,568,717 B1 * | 5/2003 | Le Clinche | ............... | 285/316 |
| 6,779,778 B2 * | 8/2004 | Kuwabara | ............... | 285/86 |
| 6,908,118 B2 * | 6/2005 | Fumioka | ............... | 285/277 |
| 7,452,006 B2 * | 11/2008 | Kohda | ............... | 285/316 |
| 7,661,725 B2 * | 2/2010 | Kouda | ............... | 285/316 |
| 7,673,911 B2 * | 3/2010 | Liu | ............... | 285/316 |

FOREIGN PATENT DOCUMENTS

EP   0 079 274   5/1983

(Continued)

OTHER PUBLICATIONS

International Search Report issued Dec. 18, 2007 in the International (PCT) Application No. PCT/JP2007/072613.

*Primary Examiner* — David E Bochna
(74) *Attorney, Agent, or Firm* — Wenderoth, Lind & Ponack, L.L.P.

(57) ABSTRACT

A coupling according to the present invention has a socket (2) and a plug (30) that is inserted into and connected to the socket. The socket includes a socket body (10) having a first through-hole (13b) for a plug-locking element (12b) and an elongated second through-hole (13a) for a sleeve-actuating element (50), and a sleeve (50) set around the socket body. The sleeve is urged by a spring member (15) toward a position for pressing the plug-locking element (12b) against a locking recess (34) of the plug to prevent the plug from slipping out of the socket. The sleeve has a locking surface (50b) that presses the plug-locking element in the position described above. When being inserted into the socket, the plug engages with the sleeve-actuating element to move the sleeve rearward, thereby disengaging the locking surface from the plug-locking element.

10 Claims, 11 Drawing Sheets

FOREIGN PATENT DOCUMENTS

| | | |
|---|---|---|
| EP | 351439 A1 * | 1/1990 |
| FR | 2 516 201 | 5/1983 |
| JP | 58-88294 | 5/1983 |
| JP | 59-39391 | 3/1984 |
| JP | 2000-266264 | 9/2000 |
| WO | 2005/028940 | 3/2005 |

* cited by examiner (a)

(b)

(a)  (b)

COUPLING, AND SOCKET AND PLUG FOR USE IN THE COUPLING

TECHNICAL FIELD

The present invention relates to a coupling comprising a socket and a plug. More particularly, the present invention relates to a pipe coupling comprising a socket and a plug that can be connected to each other simply by inserting the plug into the socket. The present invention also relates to a socket and a plug that are usable in such a coupling.

BACKGROUND ART

Among conventional pipe couplings of the type described above is a pipe coupling proposed by the present applicant in International Patent Application Publication No. 2005/028940.

The pipe coupling disclosed in International Patent Application Publication No. 2005/028940 comprises a socket and a plug that is inserted into and connected to the socket. The socket has a plurality of circumferentially spaced and radially displaceable plug-locking elements and a plurality of circumferentially spaced and radially displaceable sleeve-actuating elements provided at a position closer to a plug-receiving end opening of the socket than the plug-locking elements. The socket further has a sleeve axially displaceably provided on the outer periphery of the socket to press the plug-locking elements against an engagement groove provided on the outer peripheral surface of the plug to lock the plug as inserted into the socket.

With this pipe coupling, when the plug is not inserted in the socket, the sleeve is pressing the plug-locking elements radially inward by a cylindrical locking surface formed on the inner periphery of the sleeve. Meanwhile, the sleeve-actuating elements are in engagement with the radially inner end of a sleeve inclined surface that is inclined radially outward toward the forward end of the sleeve from the forward end edge of the locking surface of the sleeve. When the plug is inserted into the socket, first, an inclined surface at the forward end of the plug pushes the sleeve-actuating elements radially outward, causing the sleeve-actuating elements to be displaced radially outward while pressing the sleeve inclined surface, thereby displacing the sleeve axially rearward. When the sleeve-actuating elements reach the radially outer end of the sleeve inclined surface, the radially inner end of the sleeve inclined surface reaches a position where it engages with the plug-locking elements. As the plug is further inserted into the socket, the plug-locking elements are displaced radially outward while pressing the sleeve inclined surface. When the forward end inclined surface of the plug has moved forward beyond the plug-locking elements, the plug-locking elements and the sleeve-actuating elements enter a locking recess formed on the outer peripheral surface of the plug. Consequently, the sleeve is returned by a spring force to its initial position, where the locking surface of the sleeve presses the plug-locking elements in the locking recess, thereby preventing the plug from slipping out of the socket.

Patent Literature 1: International Patent Application Publication No. 2005/028940

DISCLOSURE OF INVENTION

Technical Problem

As will be understood from the above, in the above-described pipe coupling, if the sleeve is displaced rearward when the plug and the socket are connected to each other, the locking surface releases the plug-locking elements from its hold, and the sleeve inclined surface comes to engage with the plug-locking elements. If, in this state, a force is applied to the plug in the direction for pulling it out from the socket, the plug-locking elements can be displaced radially outward while pressing the sleeve inclined surface. Thus, the plug can be disconnected from the socket. The distance between the sleeve inclined surface and a point at which the plug-locking elements are engaged with the locking surface when the plug and the socket are normally connected together corresponds to the axial length of the sleeve inclined surface, as will be clear from the above. If the angle of inclination of the sleeve inclined surface is reduced, the axial length thereof increases. However, if the inclination angle is made smaller than a predetermined angle, it becomes impossible for the above ball to displace the sleeve axially by pressing the sleeve inclined surface. Therefore, the axial length of the sleeve inclined surface cannot be increased much. For this reason, the above-described pipe coupling has a possibility that when the plug and the socket are in connection to each other, the lock effected by the plug-locking elements may be undesirably released by a slight rearward movement of the sleeve that may be caused, for example, by a fall or an unexpected impact.

The present invention has been made in view of the above-described circumstances. An object of the present invention is to provide a coupling designed so that the locking of the plug-locking elements effected by the sleeve cannot easily be released.

Solution to Problem

The present invention provides a coupling comprising a socket (denoted by reference numeral 2 in the following description of embodiments of the present invention) and a plug (30) that is inserted into and connected to the socket. The plug (30) has an insert part (31) extending rearward from the forward end of the plug. The insert part is designed to be inserted into the socket. The insert part has a push portion (32) projecting radially from the outer peripheral surface thereof and a locking recess (34) provided behind and adjacent to the push portion. The socket (2) includes a tubular socket body (10) having a forward end opening that receives the plug (30), a first through-hole (embodied as a round hole 13*b* in the following description of the embodiments) extending radially through the socket body, and a second through-hole extending radially through the socket body and elongated in the longitudinal direction of the socket. The socket (2) further includes a plug-locking element (12*b*) movably provided in the first through-hole (13*b*) in the radial direction. The plug-locking element is displaceable between a first radial position where the plug-locking element engages in the locking recess (34) on the outer peripheral surface of the plug (30) as inserted into the socket (2) to prevent the plug from being pulled out of the socket and a second radial position where the plug-locking element is displaced radially outward from the first radial position to disengage from the locking recess, thereby allowing the plug to be pulled out of the socket. The socket (2) further includes a sleeve-actuating element (12*a*) set in the second through-hole and displaceable in the longitudinal direction along the second through-hole, and a sleeve (50) set around the socket body (10) and displaceable in the longitudinal direction of the socket body. The sleeve has an inner peripheral surface comprising a locking surface (50*b*) that prevents the plug-locking element located at the first radial position from moving radially outward to the second radial position, a release surface (50c) located forward of the locking surface in the longitudinal direction of the socket body to allow the plug-locking element to move radially outward to the second radial position, and an inclined surface (50a) provided between the release surface and the locking surface, and inclined radially inward from the release surface toward the locking surface. The socket (2) further includes a spring member that urges the sleeve forward in the longitudinal direction of the socket body so that, when the plug is not inserted in the socket, the sleeve is set in an initial position where the locking surface of the sleeve is positioned radially outward of the plug-locking element and the inclined surface engages with the sleeve-actuating element. When the plug (30) is inserted into the socket (2), the sleeve-actuating element (12a) is moved rearward by the push portion (32) of the plug along the second through-hole (13a) to move the sleeve. When the inclined surface (50a) of the sleeve (50) comes close to the plug-locking element (12b), the movement of the sleeve-actuating element along the second through-hole (13a) is stopped. As the plug (30) is further inserted into the socket, the sleeve-actuating element (12a) is pushed radially outward by the push portion (32) of the plug to press the inclined surface (50a) of the sleeve (50), causing the sleeve to be displaced rearward, whereby the inclined surface (50a) of the sleeve is positioned to face the plug-locking element (12b) in the radial direction of the sleeve, and the sleeve-actuating element (12a) is allowed to ride over the push portion of the plug to enter the locking recess (34). As the plug (30) is further inserted into the socket, the push portion (32) advances while pressing the plug-locking element (12b) against the inclined surface (50a) of the sleeve to displace the sleeve rearward and pushing the plug-locking element (12b) radially outward, thereby allowing the plug-locking element (12b) to ride over the push portion (32) of the plug to enter the locking recess (34). As a result, the spring member (15) returns the sleeve (50) to the initial position, and the inclined surface (50a) of the sleeve (50) engages and causes the sleeve-actuating element (12a) to return forward along the second through-hole (13a).

In this coupling, the second through-hole is an elongated hole extending in the axial direction of the socket body. When the plug is inserted into the socket, first, the sleeve-actuating element is displaced rearward along the second through-hole, thereby displacing the sleeve rearward. When the inclined surface of the sleeve comes close to the plug-locking element, the movement of the sleeve-actuating element along the second through-hole is stopped, and the sleeve-actuating element is displaced radially outward, thereby further displacing the sleeve rearward, whereby the inclined surface of the sleeve is positioned to face the plug-locking element in the radial direction. Therefore, the distance between the inclined surface of the sleeve and the position at which the plug-locking element engages the locking surface of the sleeve when the sleeve is returned to the initial position upon completion of the insertion of the plug into the socket can be increased in comparison to the above-described publicly known coupling. Accordingly, it is possible to reduce the possibility that the plug may be accidentally disconnected from the socket.

Specifically, the plug-locking element and the sleeve-actuating element may be spheres.

The arrangement may be as follows. The second through-hole has a forward end and a rear end. When the sleeve is in the initial position, the sleeve-actuating element is in engagement with the forward end. When the sleeve is moved rearward and consequently the inclined surface comes close to the plug-locking element, the sleeve-actuating element engages with the rear end to stop moving.

More specifically, the arrangement may be as follows. The push portion (32) has an inclined surface (32a) facing toward the forward end of the plug and inclined radially outward toward the rear end of the plug. The inclined surface of the push portion causes the sleeve-actuating element (12a) and the plug-locking element (12b) to be displaced radially outward. The angle ($\alpha$) made between the inclined surface (32a) of the push portion and the axis of the plug is larger than the angle ($\beta$) made between the inclined surface (50a) of the sleeve (50) and the axis of the sleeve.

The reason for this arrangement is as follows. As the plug is inserted into the socket, the push portion engages with the sleeve-actuating element, and the sleeve-actuating element engages between the push portion and the inclined surface of the sleeve. At this time, the above-described arrangement prevents the sleeve-actuating element from being displaced radially outward along the inclined surface of the sleeve by the force from the plug but allows the sleeve-actuating element to push the sleeve rearward with the force from the plug.

Specifically, the arrangement may be as follows. The second through-hole (13a) has a substantially sectorial cross-sectional shape that narrows in width toward the radially inner side of the socket body (10). The second through-hole has an outer opening and an inner opening that open on the outer and inner peripheral surfaces, respectively, of the socket body. The sleeve-actuating element (12a) is a sphere that partially projects from the outer and inner openings of the second through-hole. When the plug is inserted into the socket, the push portion (32) engages with the sleeve-actuating element (12a) partially projecting from the inner opening. When the sleeve (50) is returned to the initial position that the sleeve assumes when the plug is not inserted in the socket, the inclined surface (50a) of the sleeve engages with the sleeve-actuating element (12a) partially projecting from the outer opening to return the sleeve to the initial position, together with the sleeve-actuating element.

The locking recess may be arranged as follows. The locking recess has a first portion having a depth at which the plug-locking element as received therein does not block movement of the sleeve urged by the spring member, and a second portion (stepped portion 36) provided closer to the rear end of the plug than the first portion. The second portion is shallower than the first portion. The sleeve-actuating element engages with the second portion when the sleeve-actuating element is moved together with the sleeve returning to the initial position.

The reason for the above-described arrangement is as follows. When the sleeve-actuating element returned to the initial position along the inner opening of the second through-hole engages with the second portion, the sleeve-actuating element is raised relative to the second through-hole to reduce the pressing force applied to the opposite side walls defining the second through-hole, thereby reducing a damage to the side walls due to friction or the like.

More specifically, the arrangement may be as follows. The sleeve has a projection (50d) at a portion of the inclined surface (50a) extending from the locking surface (50b) to the release surface (50c), which is adjacent to the locking surface (50b), so that the projection engages with the sleeve-actuating element when the socket is in the initial position and when the sleeve is returned to the initial position.

In the coupling arranged as stated above, the force that the projection (50d) applies to the sleeve-actuating element when the sleeve returns to the initial position is larger than in a case where the sleeve has no projection and the inclined surface (50a) engages with the sleeve-actuating element to return it to the initial position. Thus, the sleeve-actuating element can be returned even more reliably.

In addition, the present invention provides a socket of a coupling including the socket and a plug having an insert part (31) extending rearward from the forward end of the plug, and this insert part is designed to be inserted into the socket. The insert part has on the outer peripheral surface thereof a push portion (32) and a locking recess (34) formed behind and contiguously with the push portion. The socket includes a socket body (10) having a forward end opening that receives the push portion of the plug. The socket body further has a first through-hole (13b) extending radially through the socket body, and a second through-hole (13a) extending radially through the socket body and elongated in the longitudinal direction of the socket. The socket further includes a plug-locking element (12b) movably provided in the first through-hole in the radial direction. The plug-locking element is displaceable between a first radial position where the plug-locking element engages in the locking recess of the plug to prevent the plug from being pulled out of the socket and a second radial position where the plug-locking element is displaced radially outward from the first radial position to disengage from the locking recess, thereby allowing the plug to be pulled out of the socket. The socket further includes a sleeve-actuating element set in the second through-hole and displaceable in the longitudinal direction along the second through-hole, and a sleeve (50) set around the socket body and displaceable in the longitudinal direction of the socket body. The sleeve has an inner peripheral surface comprising a locking surface (50b) that prevents the plug-locking element located at the first radial position from moving radially outward to the second radial position, a release surface (50c) located forward of the locking surface in the longitudinal direction of the socket body to allow the plug-locking element to move radially outward to the second radial position, and an inclined surface (50a) provided between the release surface and the locking surface and inclined radially inward from the release surface toward the locking surface. The socket further includes a spring member that urges the sleeve (50) forward in the longitudinal direction of the socket body so that, when the plug is not inserted in the socket, the sleeve is set in an initial position where the locking surface (50b) of the sleeve is positioned radially outward of the plug-locking element and the inclined surface (50a) engages with the sleeve-actuating element. When the plug is inserted into the socket, the sleeve-actuating element (12a) is moved rearward by the push portion (32) of the plug along the second through-hole (13a) to move the sleeve rearward. When the inclined surface (50a) of the sleeve comes close to the plug-locking element (12b), the movement of the sleeve-actuating element along the second through-hole is stopped. As the plug is further inserted into the socket, the sleeve-actuating element is pushed radially outward by the push portion of the plug to press the inclined surface of the sleeve, causing the sleeve to be displaced rearward, whereby the inclined surface of the sleeve is positioned to face the plug-locking element in the radial direction of the sleeve, and the sleeve-actuating element is allowed to ride over the push portion of the plug to enter the locking recess (34). As the plug is further inserted into the socket, the push portion (32) advances while pressing the plug-locking element (12b) against the inclined surface (50a) of the sleeve to displace the sleeve rearward and pushing the plug-locking element (12b) radially outward, thereby allowing the plug-locking element to ride over the push portion of the plug to enter the locking recess. As a result, the spring member returns the sleeve to the position that the sleeve assumes when the plug is not inserted into the socket, and the inclined surface of the sleeve engages and causes the sleeve-actuating element to return forward along the second through-hole.

Specifically, the inclined surface (50a) may have a projection (50d) at a portion thereof adjacent to the locking surface (50b) so that the projection (50d) of the inclined surface engages with the sleeve-actuating element (12a) when the sleeve (50) is in the above-described initial position and when the sleeve is returned to the initial position.

In addition, the present invention provides a plug inserted into and connected to the above-described socket and this plug has an insert part (31) extending rearward from the forward end of the plug. The insert part is designed to be inserted into the socket. The insert part has on the outer peripheral surface thereof a push portion (32) and a locking recess (34) formed behind and contiguously with the push portion (32). The locking recess has a first portion having a depth at which the plug-locking element (12b) as received therein does not block movement of the sleeve (50) urged by the spring member (15), and a second portion (36) provided closer to the rear end of the plug than the first portion. The second portion (36) is shallower than the first portion. The sleeve-actuating element (12a) engages with the second portion when the sleeve-actuating element is moved together with the sleeve returning to the initial position. Thus, the sleeve-actuating element (12a) is raised in the second through-hole.

BEST MODE FOR CARRYING OUT THE INVENTION

Embodiments of the coupling according to the present invention in which the coupling is applied to a pipe coupling will be explained below with reference to the accompanying drawings.

First Embodiment

Figure 1:
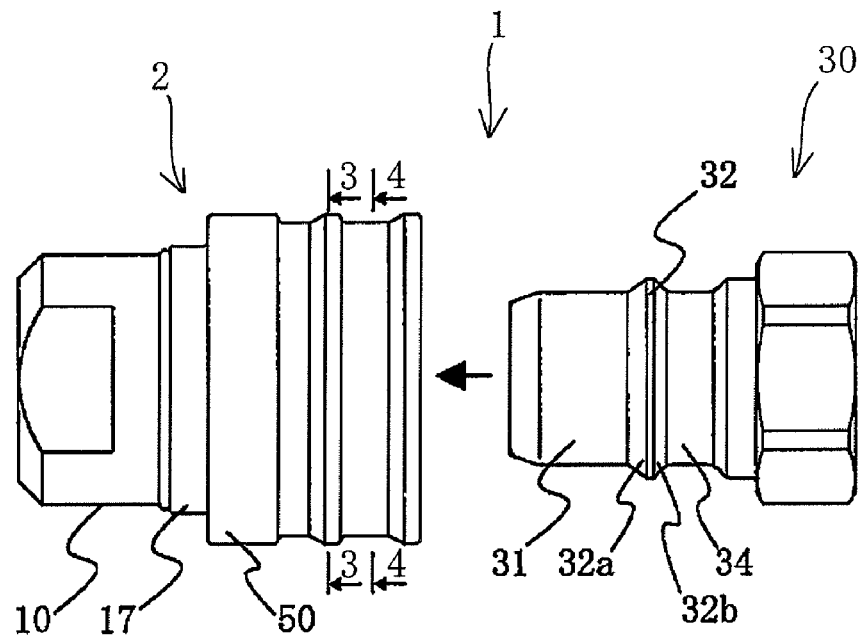
[FIG. 1] is a side view showing the appearance of a socket and a plug that constitute a pipe coupling according to a first embodiment of the present invention.

A pipe coupling 1 according to the present invention comprises a socket 2 and a plug 30 that is inserted into and connected to the socket 2. The socket 2 has a socket body 10 and a sleeve 50 mounted around the socket body 10. The sleeve 50 is displaceable in the axial direction (in the horizontal direction in FIG. 1). The plug 30 has an insert part 31 that is inserted into the socket body 10. The insert part 31 has an annularly projecting push portion 32 on the outer peripheral surface thereof. An annular locking recess 34 is provided at the rear of the push portion 32 (at the right-hand side of the push portion 32 in FIG. 1).

The socket body 10 and the plug 30 have respective valves (not shown) therein that are opened when the socket body 10 and the plug 30 are connected to each other.

Figure 2:
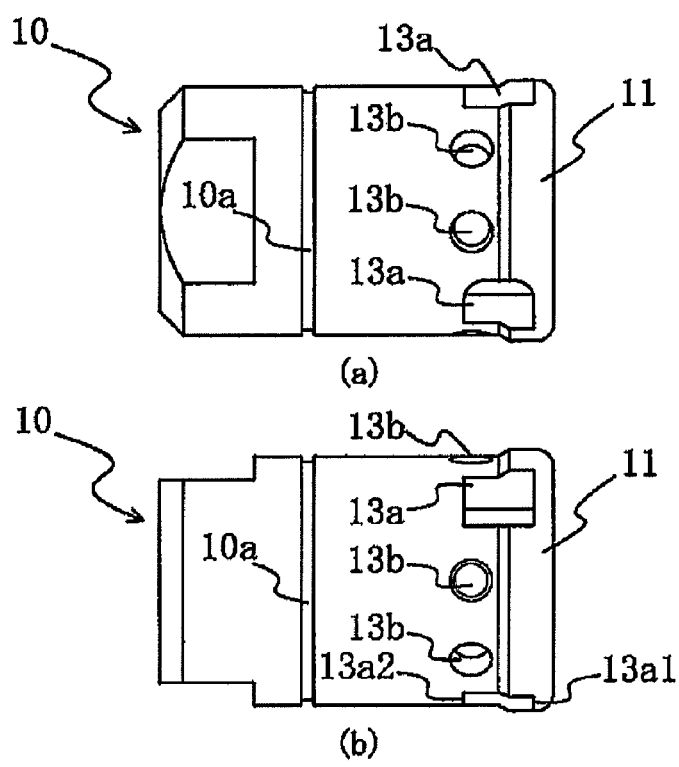
[FIG. 2] is an outside view showing the socket in FIG. 1 with a sleeve removed therefrom.

The socket body 10 is substantially tubular and has a plug-receiving part 11 for receiving the insert part 31 of the plug 30. The plug-receiving part 11 has slots 13a for receiving spherical sleeve-actuating elements 12a. The slots 13a are provided through the wall of the plug-receiving part 11 to extend in the axial direction of the socket body 10 (in the horizontal direction in FIG. 2). The slots 13a each have substantially rectangular openings on the inner and outer surface sides, respectively, of the plug-receiving part 11. In the illustrated example, three slots 13a are provided at equal intervals in the circumferential direction of the plug-receiving part 11. The plug-receiving part 11 is further provided with six round holes 13b at predetermined intervals in the circumferential direction thereof to receive spherical plug-locking elements 12b.

Figure 3:
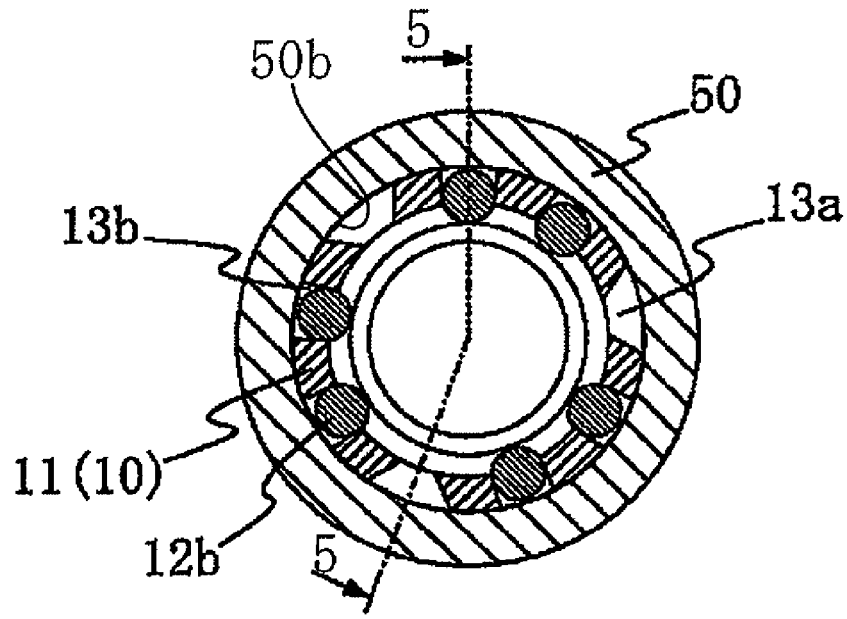
[FIG. 3] is a diametrical sectional view of the sleeve and the socket taken along the line 3-3 in FIG. 1.

As shown in FIG. 3, each round hole 13b has an outer opening that opens on the outer peripheral surface of the plug-receiving part 11. The outer opening has substantially the same diameter as that of the plug-locking element 12b. Each round hole 13b further has an inner opening that opens on the inner peripheral surface of the plug-receiving part 11. The inner opening has a diameter smaller than that of the plug-locking element 12b. The plug-locking element 12b accommodated in each round hole 13b is retained such that it partially projects from the inner opening of the plug-receiving part 11, but substantially no part of the plug-locking element 12b projects from the outer opening of the plug-receiving part 11. The plug-locking elements 12b are fitted into the locking recess 34 of the plug 30 to prevent the plug 30 from slipping out of the socket 2, as will be stated later.

Figure 4:
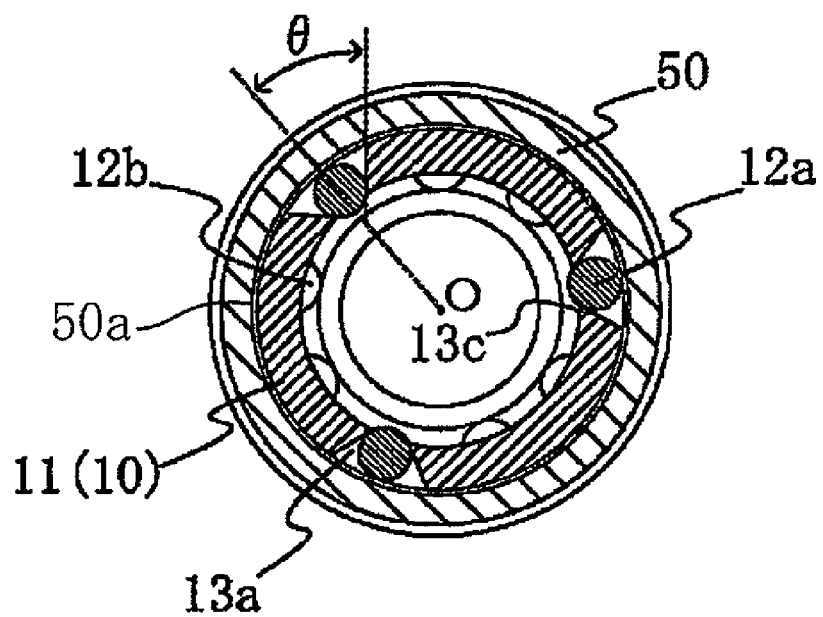
[FIG. 4] is a diametrical sectional view of the sleeve and the socket taken along the line 4-4 in FIG. 1.

As shown in FIGS. 3 and 4, the slots 13a have a substantially trapezoidal or sectorial cross-sectional shape. Each slot 13a has an inner opening that opens on the inner peripheral surface of the plug-receiving part 11. The inner opening has a diameter smaller than that of the sleeve-actuating element 12a. Each slot 13a further has an outer opening that opens on the outer peripheral surface of the plug-receiving part 11. The outer opening has a diameter larger than that of the sleeve-actuating element 12a. The sleeve-actuating element 12a accommodated in each slot 13a is retained in the state of partially projecting from the inner and outer openings.

As shown in FIG. 4, the cross-section of each slot 13a is defined by two inclined surfaces. The extension of one of the inclined surfaces makes an angle θ with a straight line extending radially from the center point O of the plug-receiving part 11 and passing through the center of the slot 13a. In this embodiment, the angle θ is about 40 degrees. If the angle θ is not larger than about 40 degrees, the sleeve-actuating element 12a receives an increased counterforce from the side surfaces of the slot 13a when the sleeve-actuating element 12a is pressed radially inward, and hence the friction between the sleeve-actuating element 12a and the side surfaces of the slot 13a increases, thus making it difficult for the sleeve-actuating element 12a to slide along the slot 13a. The value of the angle θ, however, is not limited to 40 degrees but may be about 30 degrees, for example, provided that the sleeve-actuating element 12a can slide along the slot 13a.

The sleeve 50 has a cylindrical locking surface 50b, a release surface 50c and an inclined surface 50a. In the state shown in FIG. 5, the locking surface 50b presses the plug-locking elements 12b from the radially outer side to keep the plug-locking elements 12b partially projecting from the respective inner openings of the round holes 13b. The release surface 50c allows the plug-locking elements 12b to move radially outward to withdraw into the inner openings of the round holes 13b. The inclined surface 50a is inclined from the release surface 21 toward the locking surface 20

Figure 5:
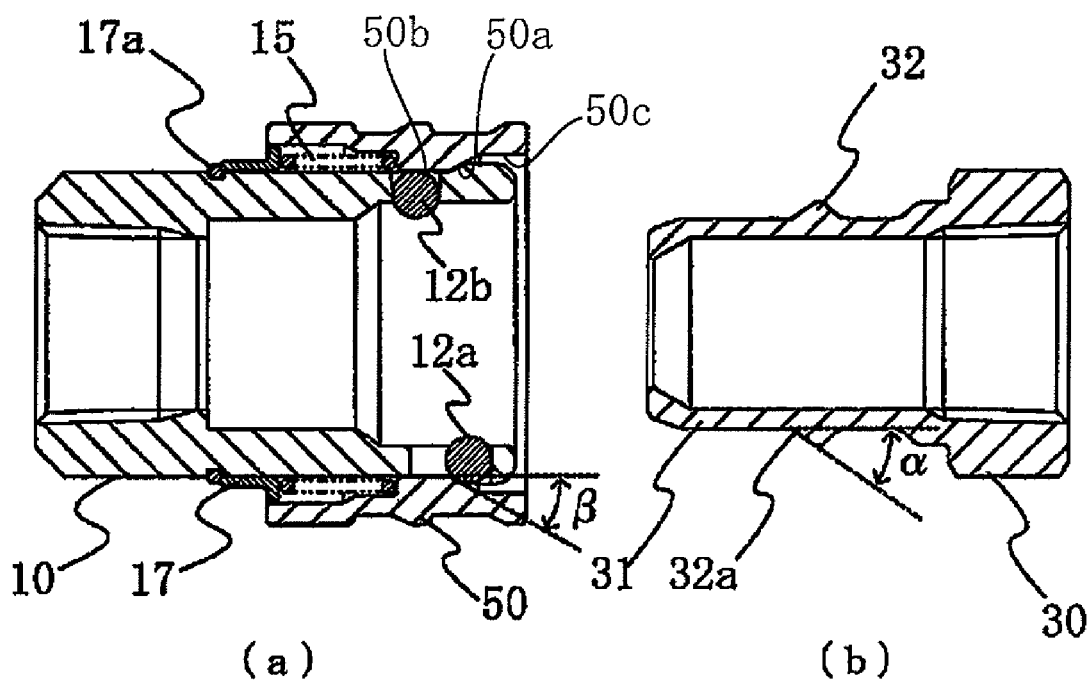
[FIG. 5](a) is a longitudinal sectional view of the sleeve and the socket taken along the line 5-5 in FIG. 3; and (b) is a longitudinal sectional view of the plug taken along the line 5-5 in FIG. 3.
Figure 11:
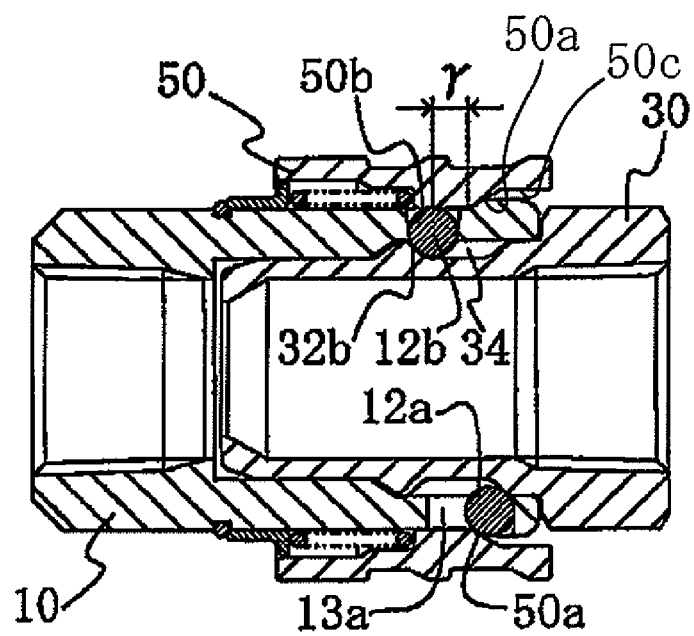
[FIG. 11] is a sectional view showing the pipe coupling in a connection completed state where the plug has been further inserted into the socket from the position shown in FIG. 10.

As will be stated later, the position of the sleeve 50 shown in FIG. 5 is the same as the position of the sleeve 50 in a state where the plug 30 has been completely connected to the socket 2, which is shown in FIG. 11. When the plug 30 is in the state shown in FIG. 11, even if a force is applied thereto to pull it out of the socket 2, because the locking surface 50b is pressing the plug-locking elements 12b from the radially outer side, the push portion 32 of the plug 30 is latched by the plug-locking elements 12b, thereby preventing the plug 30 from slipping out of the socket 2. In contract, when the sleeve 50 is moved leftward to a position where the release surface 50c radially aligns with the plug-locking elements 12b, a pulling-out force applied to the plug 30 causes the plug-locking elements 12b to be pushed radially outward by the push portion 32, thus allowing the plug 30 to be pulled out of the socket 2.

A coil spring 15 is accommodated in the space between the inner peripheral surface of the sleeve 50 and the outer peripheral surface of the plug-receiving part 11 to urge the sleeve 50 toward the right end of the socket body 10. Specifically, the left end of the coil spring 15 is engaged with an annular retaining member 17 having a flange. The right end of the coil spring 15 is engaged with the sleeve 50. The retaining member 17 is held by a C-shaped retaining ring 17a that is fitted in an engagement recess 10a (see FIG. 2) annularly formed on the outer surface of the socket body 10.

Figure 12:
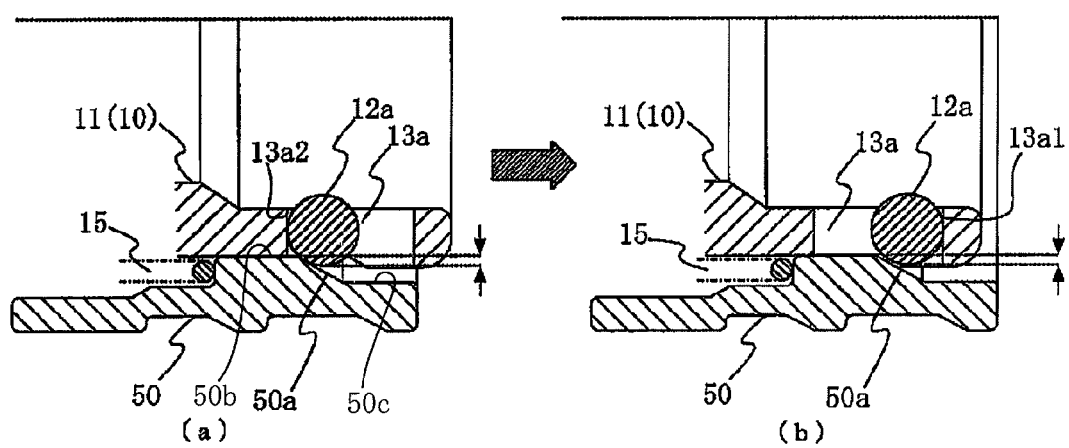
[FIG. 12](a) is a fragmentary sectional view of a main part of the pipe coupling, showing a sleeve-actuating element in the state shown in FIG. 8; and (b) is a fragmentary sectional view of the main part of the pipe coupling, showing the sleeve-actuating element in the state shown in FIGS. 5 and 11.

In the state shown in FIG. 4, a part of each sleeve-actuating element 12a (i.e. the part indicated by a pair of upward and downward arrows in FIG. 12) projects from the outer peripheral surface of the plug-receiving part 11 and abuts against the inclined surface 50a formed on the inner peripheral surface of the sleeve 50 (see part (b) of FIG. 12).

The following is an explanation of an operation performed to connect the plug 30 to the socket body 10 in the pipe coupling of the first embodiment. The explanation will be made with reference to FIGS. 6 to 12.

Figure 6:
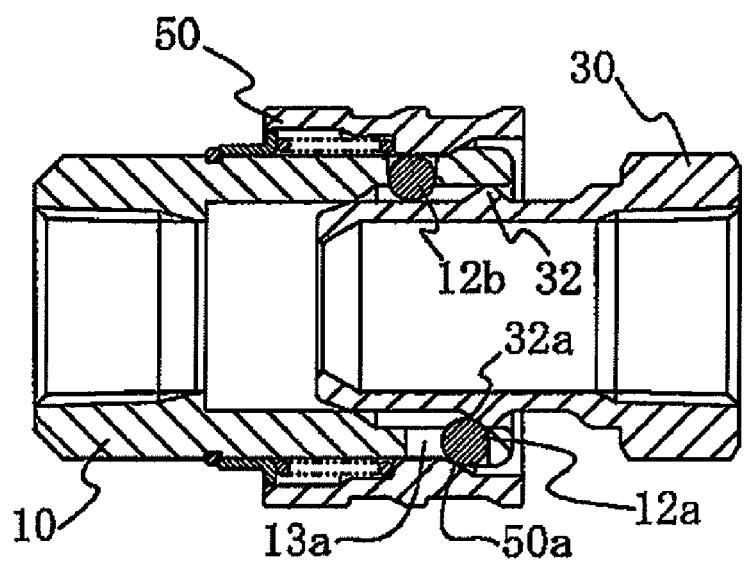
[FIG. 6] is a sectional view showing the pipe coupling according to the first embodiment in a connection starting state.
Figure 7:
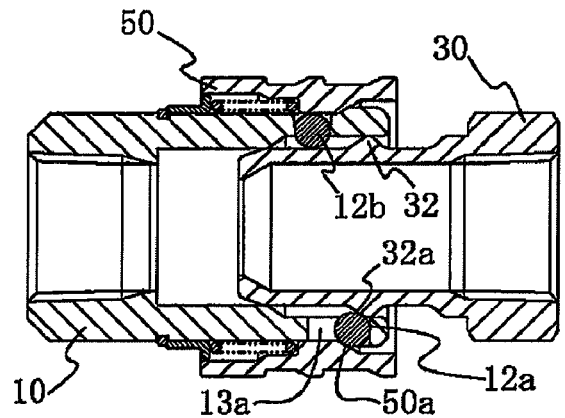
[FIG. 7] is a sectional view showing the pipe coupling in a connection starting state where the plug has been further inserted into the socket from the position shown in FIG. 6.

In the state shown in FIG. 5, the insert part 31 of the plug 30 is inserted into the plug-receiving part 11 of the socket body 10. Consequently, as shown in FIG. 6, the sleeve-actuating elements 12a that are located at the respective right ends of the slots 13a abut against an inclined surface 32a formed on the push portion 32 of the plug 30. That is, in this state, the sleeve-actuating elements 12a abut against both the inclined surface 32a of the plug 30 and the inclined surface 50a of the sleeve 50.

Figure 8:
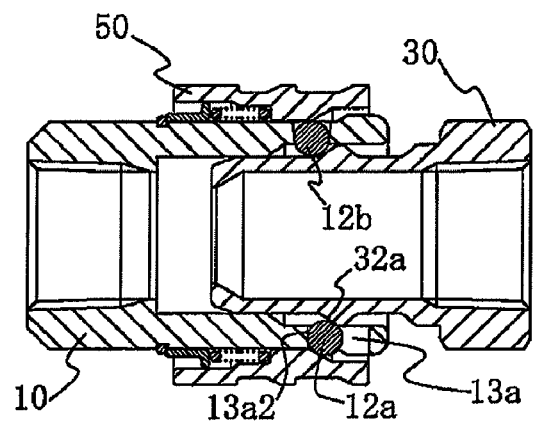
[FIG. 8] is a sectional view showing the pipe coupling in a connection progressing state where the plug has been further inserted into the socket from the position shown in FIG. 7.
Figure 9:
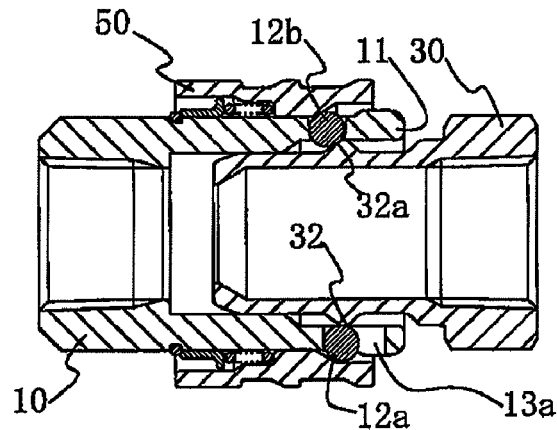
[FIG. 9] is a sectional view showing the pipe coupling in a connection progressing state where the plug has been further inserted into the socket from the position shown in FIG. 8.

As the plug 30 is further pushed into the socket body 10 from the position shown in FIG. 6, the sleeve-actuating elements 12a push the inclined surface 50a of the sleeve 50 and move to the position shown in FIG. 8. That is, the sleeve-actuating elements 12a are held between the inclined surface 32a of the plug 30 and the inclined surface 50a of the sleeve 50, and the angle α (see part (b) of FIG. 5) of the inclined surface 32a of the plug 30 is larger than the angle β (see part (a) of FIG. 5) of the inclined surface 50a of the sleeve 50. Therefore, the sleeve-actuating elements 12a are not pushed radially outward but moved along the associated slots 13a, thus moving the sleeve 50 leftward while compressing the coil spring 15.

As shown in FIG. 8, the sleeve-actuating elements 12a are stopped when reaching the respective left ends 13a2 of the slots 13a. If, in this state, the plug 30 continues to be inserted into the socket body 10, the sleeve-actuating elements 12a are displaced radially outward by the inclined surface 32a of the plug 30 to press the inclined surface 50a of the sleeve 50. This causes the sleeve 50 to be further moved rearward to the position shown in FIG. 9.

At this time, the inclined surface 32a of the plug 30 abuts against the plug-locking elements 12b, which, in turn, abut against the inclined surface 50a of the sleeve 50. As the plug 30 is further pushed into the socket body 10 from the position shown in FIG. 9, the plug-locking elements 12b are pushed by the inclined surface 32a of the plug 30 to push the inclined surface 50a of the sleeve 50, causing the sleeve 50 to move rearward. At the same time, the plug-locking elements 12b are displaced radially outward along the inclined surface 32a of the plug 30.

Figure 10:
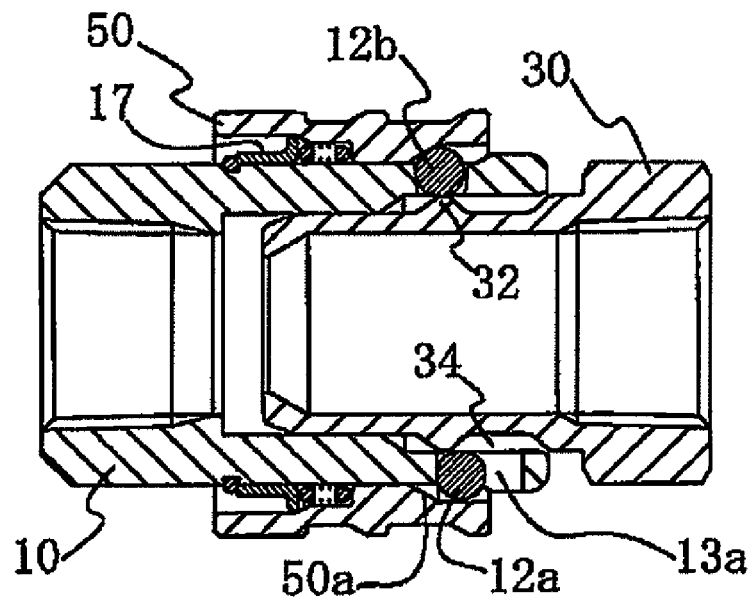
[FIG. 10] is a sectional view showing the pipe coupling in a connection progressing state where the plug has been further inserted into the socket from the position shown in FIG. 9.

As shown in FIG. 10, when the plug-locking elements 12b reach the top of the push portion 32 of the plug 30, there is no longer any force that moves the sleeve 50 leftward. Thus, the movement of the sleeve 50 is stopped.

As the plug 30 is further inserted into the socket body 50 from the position shown in FIG. 10, the sleeve-actuating elements 12a fall into the locking recess 34, followed by the plug-locking elements 12b falling into the locking recess 34. When the plug-locking elements 12b fall into the locking recess 34, the abutting contact between the plug-locking elements 12b and the inclined surface 50a of the sleeve 50 is canceled. As a result, the sleeve 50 is moved by the urging force of the coil spring 15 in a direction (rightward) opposite to the inserting direction of the plug 30 to return to the same position as the initial position that the sleeve 50 assumes when the plug 30 is not inserted into the socket body 10 (FIG. 11).

As shown in the enlarged view of FIG. 12, a part of each sleeve-actuating element 12a (i.e. the part indicated by a pair of upward and downward arrows in FIG. 12) projects from the outer peripheral surface of the plug-receiving part 11 of the socket body 10. Therefore, when the coupling mechanism shifts from the position shown in FIG. 10 to that shown in FIG. 11, the sleeve-actuating elements 12a abut against the inclined surface 50a of the sleeve 50 and are moved rightward as viewed in the figure until they abut against the respective right ends 13a1 of the slots 13a (see part (b) of FIG. 12). In this state, the plug-locking elements 12b are, as shown in FIG. 11, held and thus locked between the locking surface 50b of the sleeve 50 and the locking recess 34 of the plug 30. In the coupled state, if the plug 30 is forced to be pulled out of the socket 10, a radially outward force is applied to the plug-locking elements 12b by the inclined surface 32b of the push portion 32, and thus the plug-locking elements 12b are held by the locking surface 50b. Therefore, the plug 30 is prevented from being pulled out of the socket 10.

The following is an explanation of an operation performed to disconnect the plug 30 from the socket 10.

Figure 13:
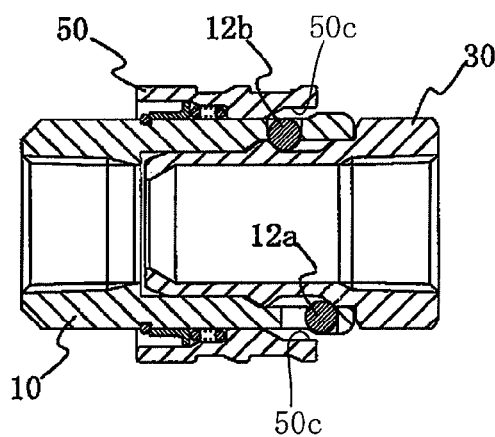
[FIG. 13] is a sectional view of the pipe coupling, showing a state where the plug has become disconnectable from the socket as a result of moving the sleeve from the connection completed state shown in FIG. 10.

The user of the pipe coupling moves the sleeve 50 rearward (leftward in FIG. 11) against the urging force of the coil spring 15. This movement of the sleeve 50 causes the release surface 50c of the sleeve 50 to be positioned around the both balls 12a and 12b, thereby bringing the sleeve-actuating and plug-locking elements 12a and 12b into a loosely fitted state. If, in this state, the plug 30 is pulled in a direction (rightward in FIG. 13) in which it is disconnected from the socket 10, the plug-locking elements 12b and the sleeve-actuating elements 12a are successively displaced toward the release surface 50c by the push portion 32 of the plug 30, thereby allowing the plug 30 to be pulled out of the socket 10.

As will be understood from the above, the pipe coupling in this embodiment has the following feature. The distance between the inclined surface 50a of the sleeve 50 and the position at which each plug-locking element 12b is engaged with the locking surface 50b of the sleeve 50 when the sleeve 10 and the plug 30 are in a coupled state is a length indicated by γ in FIG. 11. If the holes accommodating the sleeve-actuating elements 12a are round holes similar to those accommodating the plug-locking elements 12b as in the pipe coupling disclosed in the aforementioned International Patent Application Publication No. 2005/028940, the distance between the inclined surface 50a of the sleeve 50 and the position at which each plug-locking element 12b is engaged with the locking surface 50b of the sleeve 50 when the sleeve 10 and the plug 30 are in a coupled state is the length shown in FIG. 8. Accordingly, it will be clear that the above-described length γ is much longer than the length shown in FIG. 8.

Second Embodiment

A second embodiment of the pipe coupling according to the present invention will be explained with reference to FIGS. 14 to 17. It should be noted that, in the second embodiment, substantially the same members or portions as those of the first embodiment are denoted by the same reference numerals as those used in the first embodiment.

The pipe coupling 1 according to the second embodiment comprises a socket 10, a sleeve 50, and a plug 30. The constituent members of the pipe coupling 1 are the same as those used in the pipe coupling of the first embodiment, except the plug 30.

Figure 14:
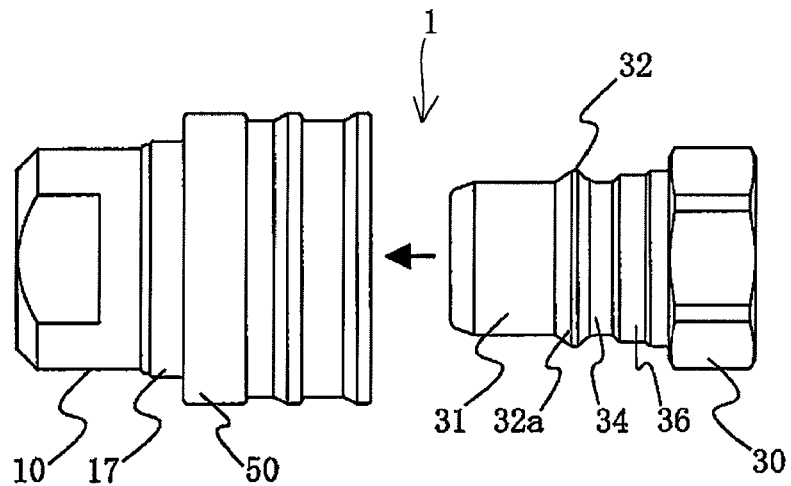
[FIG. 14] is a side view showing the appearance of a socket and a plug that constitute a pipe coupling according to a second embodiment of the present invention.
Figure 15:
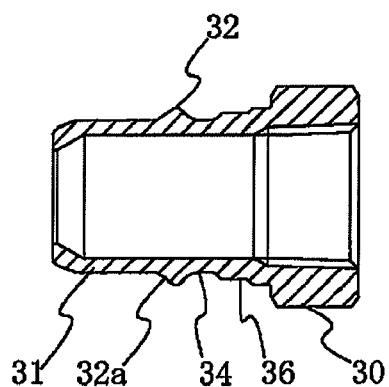
[FIG. 15] is a longitudinal sectional view of the plug in FIG. 14

As shown in FIGS. 14 and 15, the plug 30 has an annular stepped portion 36 formed at the rear of the locking recess 34. The stepped portion 36 is somewhat higher than the bottom of the locking recess 34.

The following is an explanation of an operation performed to connect the plug 30 to the socket 10.

Figure 16:
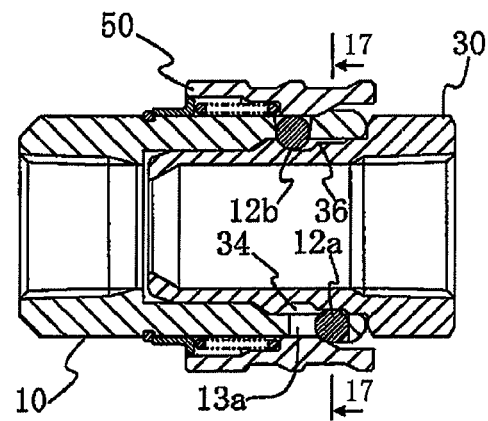
[FIG. 16] is a sectional view of the pipe coupling according to the second embodiment, showing a connection completed state where the plug has been inserted into the socket.

In the second embodiment, the successive states of the pipe coupling shown in FIGS. 6 to 10 take place in the same way as in the first embodiment. As the plug 30 is further inserted into the socket 50 from the position corresponding to that shown in FIG. 10, the plug-locking elements 12b ride over the top of the push portion 32 and fall into the locking recess 34 at the rear of the push portion 32, as shown in FIG. 16. When the plug-locking elements 12b fall into the locking recess 34, the abutting contact between the plug-locking elements 12b and the inclined surface 50a of the sleeve 50 is cancelled. As a result, the sleeve 50 moves in a direction (rightward) opposite to the insertion direction of the plug 30 to reach the position shown in FIG. 16.

At that time, the sleeve-actuating elements 12a pushed by the sleeve 50 come in contact with the stepped portion 36 and ride over it to move as far as the respective right ends 13a1 of the slots 13a.

Figure 17:
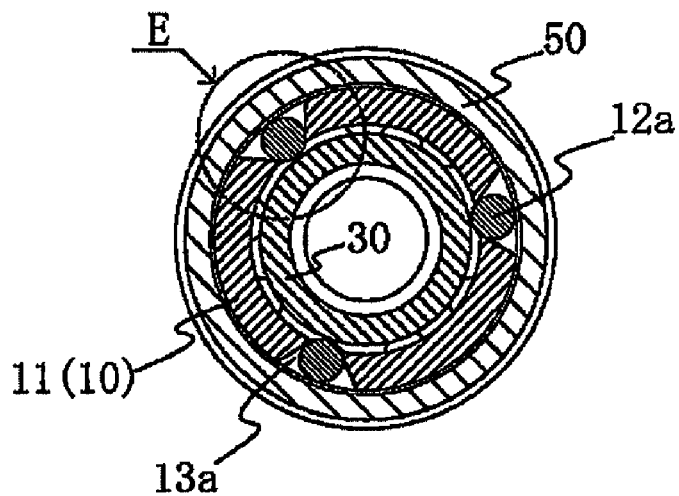
[FIG. 17] is a diametrical sectional view of the pipe coupling taken along the line D-D in FIG. 16.
Figure 18:
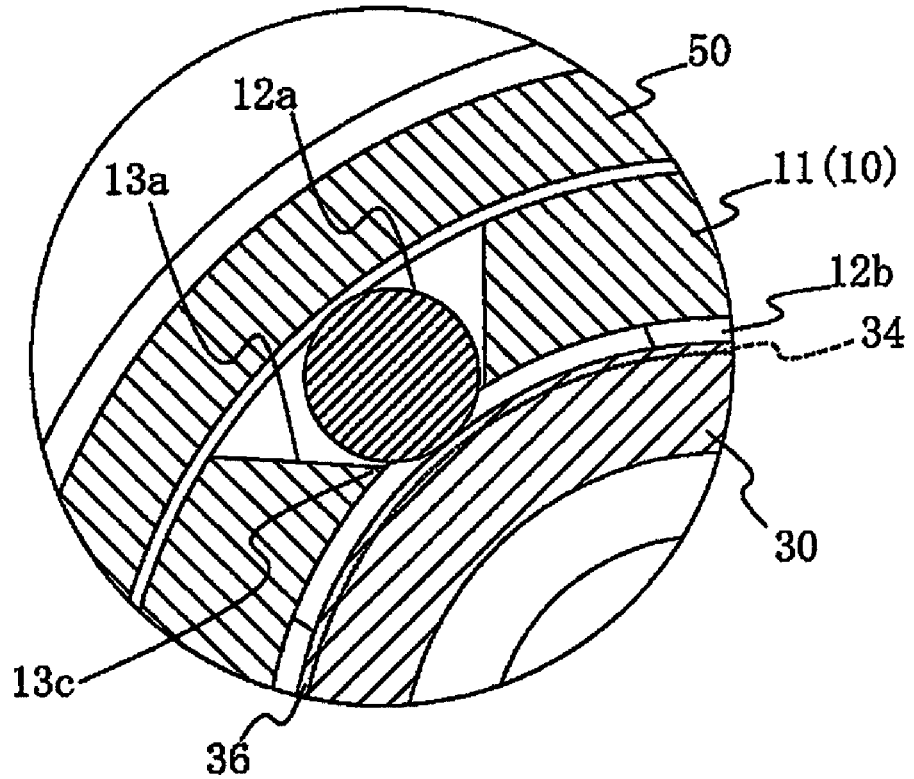
[FIG. 18] is an enlarged view of an area E in FIG. 17.
Figure 19:
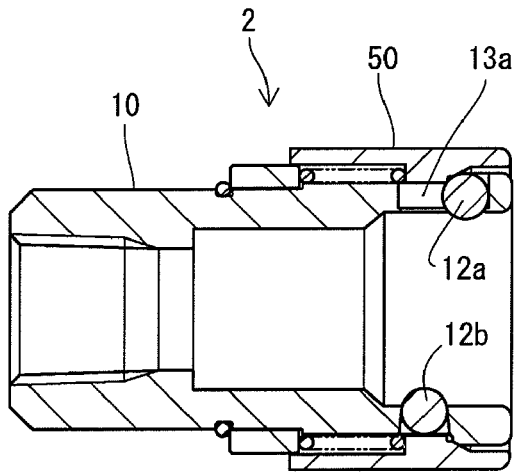
[FIG. 19] is a longitudinal sectional view of a socket of a pipe coupling according to a third embodiment of the present invention.
Figure 20:
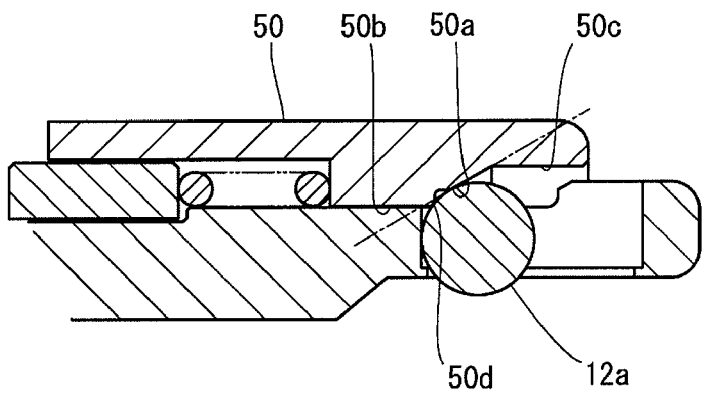
[FIG. 20] is an enlarged sectional view of a main part of the pipe coupling shown in FIG. 19.
Figure 21:
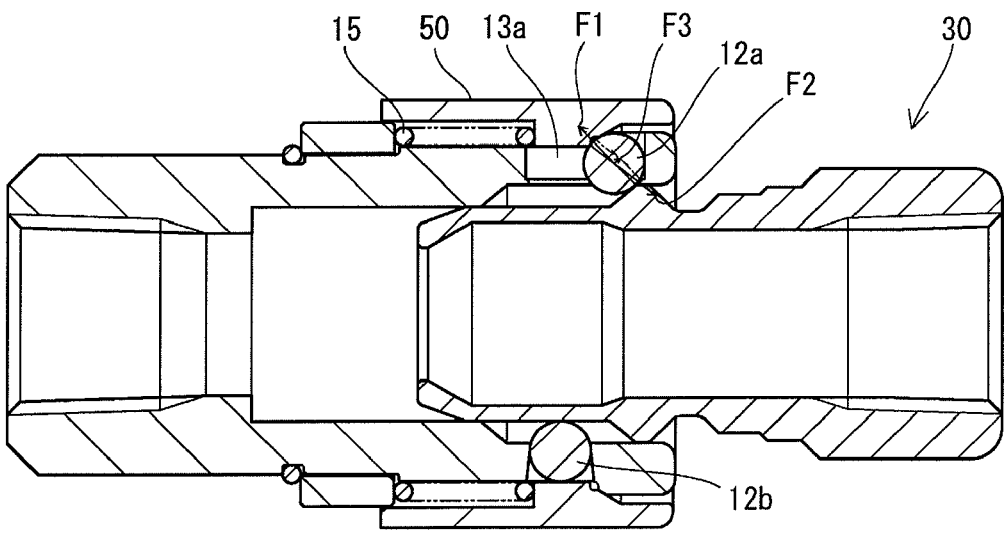
[FIG. 21] is a diagram showing the relationship between forces acting on a sleeve-actuating element when a push portion of the plug engages and presses the sleeve-actuating element upon inserting a plug into the socket shown in FIG. 19.

The reason why the plug-side stepped portion 36 is formed will be explained with reference to FIGS. 17 and 18. FIG. 17 is a sectional view taken along the line 17-17 in FIG. 16. FIG. 18 is an enlarged view of an area E enclosed in the wavy line circle in FIG. 17. As shown in FIG. 18, the inner opening edge 13c of each slot 13a is acute and thin-walled. Therefore, a sufficient strength may not be ensured for the inner opening edge 13c. In this regard, when the sleeve-actuating element 12a moves from the left to the right in the slot 13a (i.e. when the sleeve-actuating element 12a moves from the position shown in FIG. 10 to the position shown in FIG. 16), the sleeve-actuating element 12a rides over the stepped portion 36 and thus moves without contacting the inner opening edge 13c. Accordingly, deformation of the inner opening edge 13c can be prevented.

Third Embodiment

FIGS. 19 to 24 show a third embodiment of the pipe coupling according to the present invention.

The pipe coupling 1 according to the third embodiment has substantially the same structure as that of the second embodiment. In the third embodiment, the sleeve 50 has a projection 50d at a portion of the inclined surface 50a extending from the locking surface 50b to the release surface 50c, which is adjacent to the locking surface 50b.

In the illustrated example, the projection 50d is formed as an extension of the locking surface 50b that extends beyond the extension of the inclined surface 50a.

The projection 50d is designed to meet the following conditions. First, when the plug 30 is not inserted in the socket 2, the projection 50d is engaged with the sleeve-actuating elements 12a, and the inclined surface 50a of the sleeve 50 is out of engagement with the sleeve-actuating elements 12a. When the plug 30 is inserted in the socket 2 and the push portion 32 is engaged with the sleeve-actuating elements 12a, forces F1 and F2 applied to the sleeve-actuating elements 12a from the projection 50d and the push portion 32, respectively, combine together to create a radially outward force F3 (FIG. 21), which causes the sleeve-actuating elements 12a to be displaced radially outward and thus allowing the sleeve-actuating elements 12a to engage with the inclined surface 50a of the sleeve 50. When this state is reached, a radially inward force acts on the sleeve-actuating elements 12a as a combined force of the forces applied to the sleeve-actuating elements 12a from the inclined surface 50a of the sleeve 50 and the push portion 32 of the plug 30. Consequently, the sleeve-actuating elements 12a are not displaced radially but caused to move the sleeve 50 rearward as the plug 30 is inserted into the socket 2.

Figure 22:
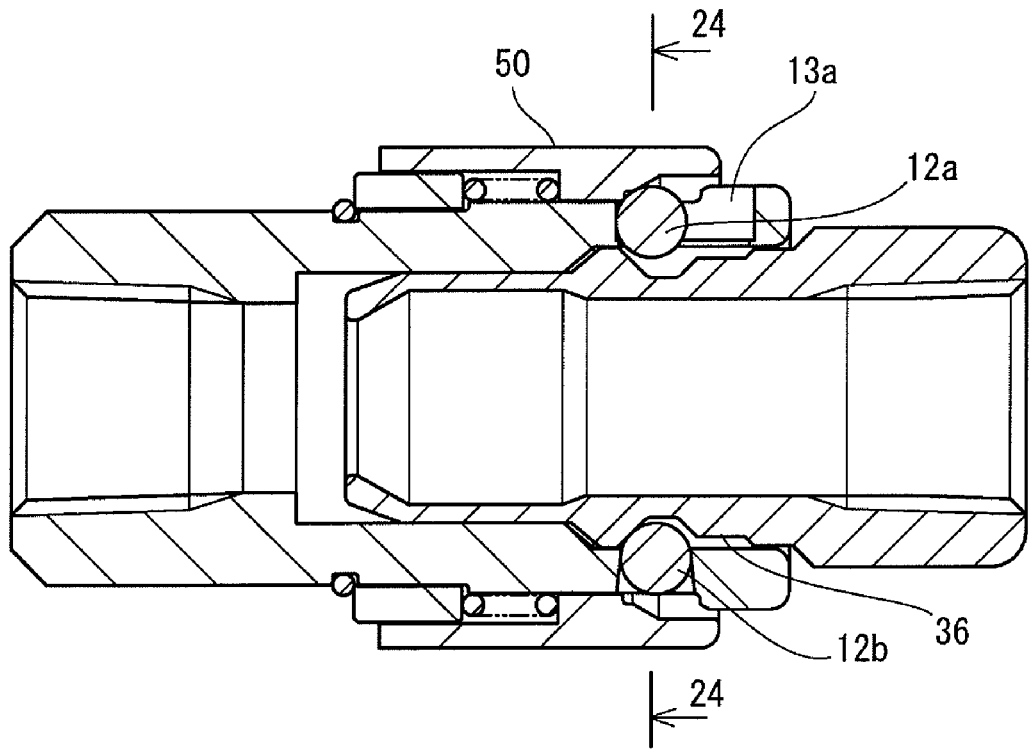
[FIG. 22] is a diagram showing a state where, as a result of progression of the insertion of the plug, the push portion of the plug has advanced beyond the sleeve-actuating element and the plug-locking element.
Figure 23:
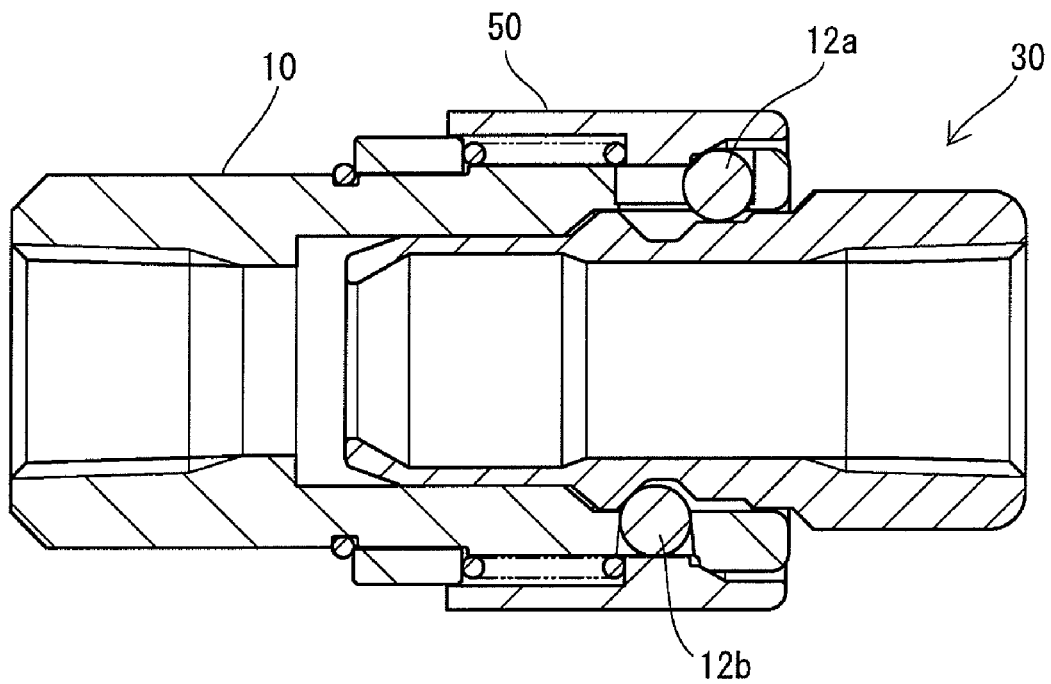
[FIG. 23] is a diagram showing a state where the sleeve has returned to its initial position.

In this pipe coupling, as the plug 30 is inserted into the socket 2, the sleeve-actuating elements 12a and the plug-locking elements 12b successively ride over the push portion 32 of the plug 30 to reach the respective positions shown in FIG. 22 in the same way as in the above-described embodiments. In this state, the sleeve 50 pushed back by the coil spring 15 engages with the sleeve-actuating elements 12a at the projection 50d and moves the sleeve-actuating elements 12a back to the initial position shown in FIG. 19, thus reaching the state shown in FIG. 23. The projection 50d and the inclined surface 50a act on the sleeve-actuating elements 12a in the above-described relation to each other. Accordingly, when the sleeve 50 is pushed back to the initial position shown in FIG. 23 in engagement with the sleeve-actuating elements 12a through the projection 50d, a larger force acts on the sleeve-actuating elements 12a than in a case where the sleeve 50 is pushed back in engagement with the sleeve-actuating elements 12a through the inclined surface 50a as in the first and second embodiments. Thus, the sleeve 12a can be returned to the initial position even more reliably.

Figure 24:
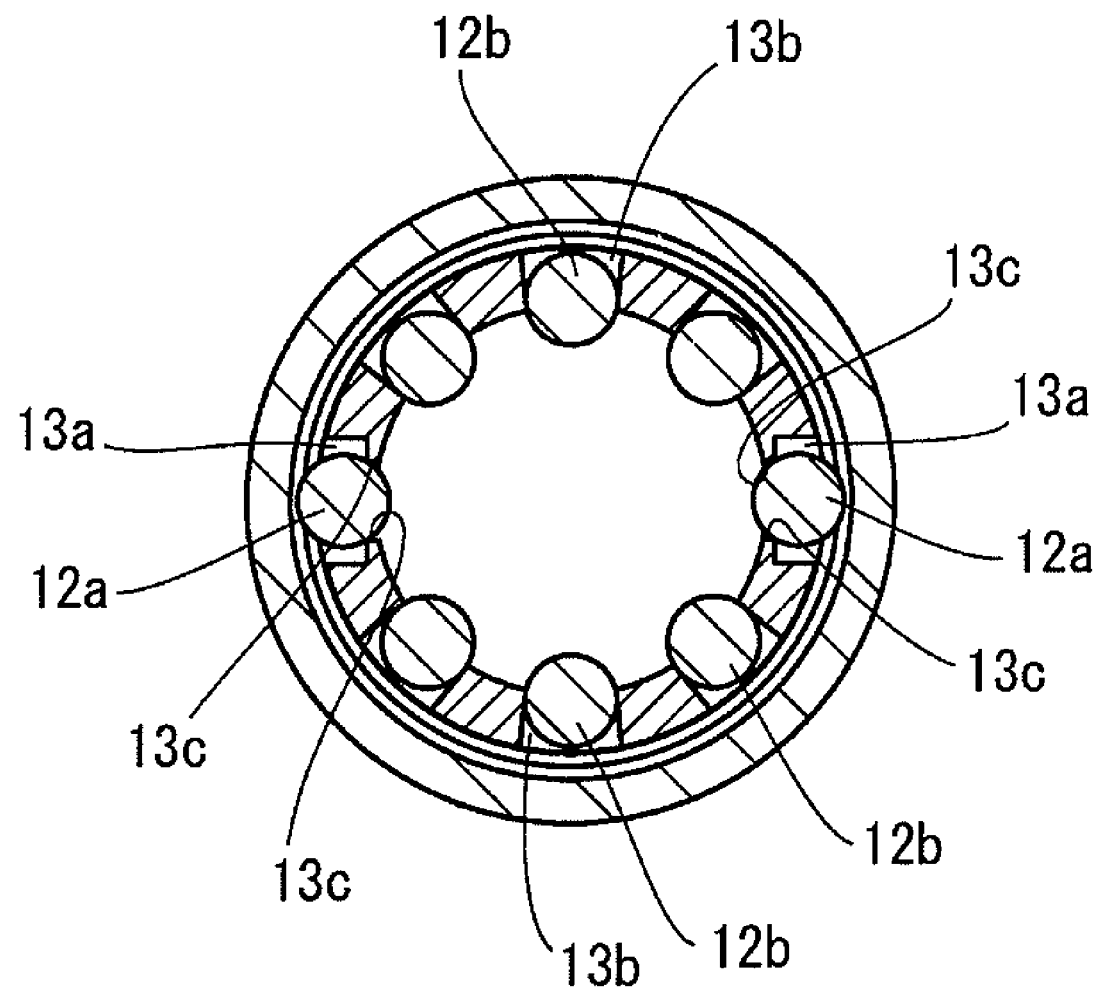
[FIG. 24] is a sectional view taken along the line 24-24 in FIG. 22.

It should be noted that FIG. 24 is a sectional view taken along the line 24-24 in FIG. 22. As illustrated in the figure, in the third embodiment, the slots 13a have a rectangular cross-sectional shape but not a sectorial one as in the first and second embodiments. The reason for this is as follows. In the case of a sectorial cross-sectional shape, the inner opening edge 13c of each slot 13a is acute and thin-walled and hence low in strength, as has been stated above. Therefore, the wall thickness of the inner opening edge 13c is increased by forming the slots 13a into a rectangular cross-sectional shape as shown in FIG. 24.

Although in the foregoing first to third embodiments the coupling of the present invention is applied to a pipe coupling, the present invention is not limited to pipe couplings but may be applied to couplings for connecting articles, for example. In the foregoing embodiments, the release surface 50c is shown as a surface parallel to the axis of the sleeve 50. The release surface 50c, however, is not limited thereto but may be any surface that allows the plug-locking elements 12b to be withdrawn into the respective inner openings of the round holes 13b serving as first through-holes. Accordingly, release surface 50c may be an inclined surface as an extension of the above-described inclined surface 50a, for example.

The invention claimed is:

1. A coupling comprising a socket and a plug that is inserted into and connected to the socket;

the plug having an insert part extending rearward from a forward end of the plug, the insert part being designed to be inserted into the socket, the insert part having a push portion projecting radially from an outer peripheral surface thereof and a locking recess provided behind and adjacent to the push portion;

the socket including:

a tubular socket body having a forward end opening that receives the insert part of the plug, a first through-hole extending radially through the socket body, and a second through-hole extending radially through the socket body and elongated in a longitudinal direction of the socket;

a plug-locking element movably provided in the first through-hole in the radial direction, the plug-locking element being displaceable between a first radial position where the plug-locking element engages in the locking recess on the outer peripheral surface of the plug as inserted into the socket to prevent the plug from being pulled out of the socket and a second radial position where the plug-locking element is displaced radially outward from the first radial position to disengage from the locking recess, thereby allowing the plug to be pulled out of the socket;

a sleeve-actuating element set in the second through-hole, the sleeve-actuating element being displaceable in the longitudinal direction along the second through-hole;

a sleeve set around the socket body, the sleeve being displaceable in the longitudinal direction of the socket body, the sleeve having an inner peripheral surface comprising a locking surface that prevents the plug-locking element located at the first radial position from moving radially outward to the second radial position, a release surface located forward of the locking surface in the longitudinal direction of the socket body to allow the plug-locking element to move radially outward to the second radial position, and an inclined surface provided between the release surface and the locking surface and inclined radially inward from the release surface toward the locking surface; and a spring member that urges the sleeve forward in the longitudinal direction of the socket body so that, when the plug is not inserted in the socket, the sleeve is set in an initial position where the locking surface of the sleeve is positioned radially outward of the plug-locking element and the inclined surface engages with the sleeve-actuating element;

wherein, when the plug is inserted into the socket, the sleeve-actuating element is moved rearward by the push portion of the plug along the second through-hole to move the sleeve rearward, and when the inclined surface of the sleeve comes close to the plug-locking element, movement of the sleeve-actuating element along the second through-hole is stopped, and as the plug is further inserted into the socket, the sleeve-actuating element is pushed radially outward by the push portion of the plug to press the inclined surface of the sleeve, causing the sleeve to be displaced rearward, whereby the inclined surface of the sleeve is positioned to face the plug-locking element in a radial direction of the sleeve, and the sleeve-actuating element is allowed to ride over the push portion of the plug to enter the locking recess, and wherein, as the plug is further inserted into the socket, the push portion advances while pressing the plug-locking element against the inclined surface of the sleeve to displace the sleeve rearward and pushing the plug-locking element radially outward, thereby allowing the plug-locking element to ride over the push portion of the plug to enter the locking recess; as a result, the spring member returns the sleeve to the initial position, and the inclined surface of the sleeve engages and causes the sleeve-actuating element to return forward along the second through-hole.

2. The coupling of claim 1, wherein the plug-locking element and the sleeve-actuating element are spheres.

3. The coupling of claim 2, wherein the push portion has an inclined surface facing toward the forward end of the plug and inclined radially outward toward a rear end of the plug, the inclined surface of the push portion causing the sleeve-actuating element and the plug-locking element to be displaced radially outward, wherein an angle made between the inclined surface of the push portion and an axis of the plug is larger than an angle made between the inclined surface of the sleeve and an axis of the sleeve.

4. The coupling of claim 1, wherein the second through-hole has a forward end and a rear end, and, when the sleeve is in the initial position, the sleeve-actuating element is in engagement with the forward end, whereas, when the sleeve is moved rearward and consequently the inclined surface comes close to the plug-locking element, the sleeve-actuating element engages with the rear end to stop moving.

5. The coupling of claim 1, wherein the second through-hole has a substantially sectorial cross-sectional shape that narrows in width toward a radially inner side of the socket body, the second through-hole having an outer opening and an inner opening that open on an outer peripheral surface and inner peripheral surface, respectively, of the socket body, the sleeve-actuating element being a sphere that partially projects from the outer opening and inner opening of the second through-hole, wherein, when the plug is inserted into the socket, the push portion engages with the sleeve-actuating element partially projecting from the inner opening, and when the sleeve is returned to the initial position that the sleeve assumes when the plug is not inserted in the socket, the inclined surface of the sleeve engages with the sleeve-actuating element partially projecting from the outer opening to return the sleeve to the initial position, together with the sleeve-actuating element.

6. The coupling of claim 5, wherein the locking recess has a first portion having a depth at which the plug-locking element as received therein does not block movement of the sleeve urged by the spring member, and a second portion provided closer to a rear end of the plug than the first portion, the second portion being shallower than the first portion, wherein the sleeve-actuating element engages with the second portion when the sleeve-actuating element is moved together with the sleeve returning to the initial position.

7. The coupling of claim 1, wherein the sleeve has a projection at a portion of the inclined surface extending from the locking surface to the release surface, which is adjacent to the locking surface, so that the projection engages with the sleeve-actuating element when the socket is in the initial position and when the sleeve is returned to the initial position.

8. A socket for use in a pipe coupling including the socket and a plug that is inserted into and connected to the socket, the plug having an insert part extending rearward from a forward end of the plug, the insert part being designed to be inserted into the socket, the insert part having on an outer peripheral surface thereof a push portion and a locking recess formed behind and contiguously with the push portion, the socket comprising:

a tubular socket body having a forward end opening that receives the push portion of the plug, the socket body further having a first through-hole extending radially through the socket body, and a second through-hole extending radially through the socket body and elongated in a longitudinal direction of the socket;

a plug-locking element movably provided in the first through-hole in the radial direction, the plug-locking element being displaceable between a first radial position where the plug-locking element engages in the locking recess of the plug to prevent the plug from being pulled out of the socket and a second radial position where the plug-locking element is displaced radially outward from the first radial position to disengage from the locking recess, thereby allowing the plug to be pulled out of the socket;

a sleeve-actuating element set in the second through-hole, the sleeve-actuating element being displaceable in the longitudinal direction along the second through-hole;

a sleeve set around the socket body, the sleeve being displaceable in the longitudinal direction of the socket body, the sleeve having an inner peripheral surface comprising a locking surface that prevents the plug-locking element located at the first radial position from moving radially outward to the second radial position, a release surface located forward of the locking surface in the longitudinal direction of the socket body to allow the plug-locking element to move radially outward to the second radial position, and an inclined surface provided between the release surface and the locking surface and inclined radially inward from the release surface toward the locking surface; and a spring member that urges the sleeve forward in the longitudinal direction of the socket body so that, when the plug is not inserted in the socket, the sleeve is set in an initial position where the locking surface of the sleeve is positioned radially outward of the plug-locking element and the inclined surface engages with the sleeve-actuating element;

wherein, when the plug is inserted into the socket, the sleeve-actuating element is moved rearward by the push portion of the plug along the second through-hole to move the sleeve rearward, and when the inclined surface of the sleeve comes close to the plug-locking element, movement of the sleeve-actuating element along the second through-hole is stopped, and as the plug is further inserted into the socket, the sleeve-actuating element is pushed radially outward by the push portion of the plug to press the inclined surface of the sleeve, causing the sleeve to be displaced rearward, whereby the inclined surface of the sleeve is positioned to face the plug-locking element in a radial direction of the sleeve, and the sleeve-actuating element is allowed to ride over the push portion of the plug to enter the locking recess, and wherein, as the plug is further inserted into the socket, the push portion advances while pressing the plug-locking element against the inclined surface of the sleeve to displace the sleeve rearward and pushing the plug-locking element radially outward, thereby allowing the plug-locking element to ride over the push portion of the plug to enter the locking recess; as a result, the spring member returns the sleeve to the initial position, and the inclined surface of the sleeve engages and causes the sleeve-actuating element to return forward along the second through-hole.

9. The socket of claim 8, wherein the inclined surface has a projection at a portion thereof adjacent to the locking surface so that the projection of the inclined surface engages with the sleeve-actuating element when the sleeve is in the initial position and when the sleeve is returned to the initial position.

10. A plug inserted into and connected to the socket of claim 8, the plug having an insert part extending rearward from a forward end of the plug, the insert part being designed to be inserted into the socket, the insert part having on an outer peripheral surface thereof a push portion and a locking recess formed behind and contiguously with the push portion, the locking recess having a first portion having a depth at which the plug-locking element as received therein does not block movement of the sleeve urged by the spring member, and a second portion provided closer to a rear end of the plug than the first portion, the second portion being shallower than the first portion, wherein the sleeve-actuating element engages with the second portion when the sleeve-actuating element is moved together with the sleeve returning to the initial position.

* * * * *